United States Patent [19]

Lake et al.

[11] Patent Number: 5,260,556
[45] Date of Patent: Nov. 9, 1993

[54] OPTICALLY READABLE CODED TARGET

[75] Inventors: Royden J. Lake; John C. Moore; Errol M. Kowald; Annegret Doerr, all of Armidale, Australia

[73] Assignee: Australian Meat & Live-Stock Research & Development Corp., Sydney, Australia

[21] Appl. No.: 690,994

[22] PCT Filed: Dec. 20, 1989

[86] PCT No.: PCT/AU89/00551
§ 371 Date: Jun. 18, 1991
§ 102(e) Date: Jun. 18, 1991

[87] PCT Pub. No.: WO90/07162
PCT Pub. Date: Jun. 28, 1990

[30] Foreign Application Priority Data

Dec. 20, 1988 [AU] Australia .................. PJ2044

[51] Int. Cl.⁵ .............................. G06K 19/06
[52] U.S. Cl. ........................ 235/494; 235/464; 235/466
[58] Field of Search ............. 235/464, 466, 494

[56] References Cited

U.S. PATENT DOCUMENTS 3,409,760 11/1968 Hamisch ..................... 235/494
3,636,317 1/1972 Torrey ........................ 235/466
3,796,863 3/1974 Nickl et al. .
3,808,405 4/1974 Johnson et al. .
3,916,160 10/1975 Russo et al. .
3,985,293 10/1976 Riffee et al. .
4,250,405 2/1981 Ashcroft et al. .
4,449,042 5/1984 Hampson ..................... 235/494
4,491,923 1/1985 Look .

FOREIGN PATENT DOCUMENTS 1774949 1/1973 Fed. Rep. of Germany .
1329454 9/1973 United Kingdom .
1492136 11/1977 United Kingdom .

*Primary Examiner*—Harold Pitts
*Attorney, Agent, or Firm*—McAulay Fisher Nissen Goldberg & Kiel

[57] ABSTRACT

A target for providing coded data readable by an imaging apparatus. Location marking means enable location of the target by the imaging apparatus preparatory to an imaging operation, the location marking means having high visibility characteristics e.g. being of retroreflective material to enable identification of the location marking means against a background. Code marking regions of annular shape include circumferentially disposed code markings containing coded data which are imaged by the imaging apparatus to enable recovery of the coded data from the target. The location marking means is located generally centrally of the code marking regions so that identification of the location marking means also locates the center of the code marking regions. The location marking means includes at least one concentric annular region to enable fine location of the center. The code marking regions are rotationally dispersed relative to the center.

19 Claims, 3 Drawing Sheets

OPTICALLY READABLE CODED TARGET

BACKGROUND OF THE INVENTION

1. Field of the Invention

The invention relates to visual code reading systems, and more particularly to coded targets for such systems.

2. Description of the Prior Art

The utilisation of barcodes and their readers is now common practice both in industry and commerce for identification of articles and information relevant thereto. They function reliably where the environment is such as not to impede a clear vision of the barcode, but they are far less reliable where any obstruction occurs to a clear view by the reader. Furthermore, of necessity the code must be passed linearly with respect to the reader. They are invariably linearly constructed as generally barcode readers do not build an image of the coded area. Instead they search for at least one scan through the code which is completely error free. If such a scan does not exist then the code is indecipherable. This restriction, however, allows simple sequential line scanning techniques to be used and provides for cheaper readers. To cope with the possibility that no single scan can be error-free a memory system must be incorporated so that at least a partial image of the coded area can be constructed. If the reader is capable of being oriented appropriately with respect to the direction of the barcode lines then this can be achieved in a single line memory register. This technique has been applied in some proximity barcode readers. However, for non-proximity reading of a randomly oriented, randomly obscured code a full image must be acquired if the chance of reading the code is to be maximised.

There are many possible applications for visual code reading if reliable operation could be assured in an environment of random movement and/or partial obscurity of the target. One such application would relate to ear tags for animals, such as cattle and sheep. As a result of the large number of possible positions into which the ear tag can be placed by the animal, substantial complexity of conventional scanning and/or recording equipment would be needed to read data from the ear tag.

SUMMARY OF THE INVENTION

It is an object of the invention to provide a coded target for visual reading which is of a reliable nature and can be provided at reasonable cost.

In accordance with the invention there is provided a coded target for providing coded data readable by an imaging apparatus, the target comprising location marking means for enabling location of the target by the imaging apparatus preparatory to an imaging operation, the location marking means having high visibility characteristics to enable identification of the location marking means against a background, the target further including at least one code marking region, each code marking region being of at least a segment of a generally annular shape, each code marking region including circumferentially disposed code markings containing coded data which are imaged by the imaging apparatus to enable recovery of the coded data from the target during or following the imaging operation.

The term "visible" and related terms such as "visibility", "optical", "imaging" and "light" do not necessarily refer only to light and visibility at wavelengths in the human visible spectrum. The invention is applicable to other wavelengths from in the order of $10^{-4}$ to $10^{-11}$ meters, such as infra red and x-ray radiation, and the terms used are to be understood as encompassing such other suitable electromagnetic radiation wavelengths.

The present invention has a basis in the realisation that once a full image has been acquired then computational procedures can treat a circular versus a linear barcode equally well. The prime considerations then become the need to maximise the data density and the need to make the data integrity independent of rotational aspect. In these latter considerations a circular format is preferred to a rectangular one.

Preferably the location marking means is located generally centrally of the code marking region(s) so that identification of the location marking means also enables the general location of the centre of the code marking region(s). The location marking means may include at least one annular region which is substantially concentric with the code marking region(s) to enable fine location of the general centre of the code marking region(s).

Preferably there are at least two code marking regions which are rotationally dispersed relative to the centre of the code marking regions so that the code markings are located at different rotational locations relative to the centre of the code marking regions whereby occlusion of a segment of the target does not occlude both corresponding segments of the code marking regions.

There may be at least two code marking regions which are concentric with the location marking means so that the target has an integrated common optical centre, the code marking regions being rotationally dispersed whereby the code marking regions do not substantially bias or offset the location of the target and its general centre and whereby the code marking regions can be uniquely decoded even with the presence of foreign materials occluding parts of the code marking regions.

Preferably the location marking means is located concentrically with the code marking region(s) so as to provide a datum for location of the code marking regions by the imaging apparatus. The annular region may comprise at least two rings, one ring having high visibility characteristics and a further ring having contrasting low visibility characteristics, the contrasting rings facilitating identification of the annular region during the location operation.

Where the location marking means comprises an annular region, that region is preferably located at a significant radial distance from the general centre of the code marking region(s) so as to facilitate identification of the annular region, but not at the edge of the target where degradation of the annular region may interfere with the imaging operation.

Preferably each code marking region is defined by a respective segment of an annulus, the circumferential boundaries of the segment being defined by respective radii from the centre of the code marking regions. There may be at least two code marking regions which each contain the same coded data so that the coded data is replicated in full at least twice by the target thereby enabling attempted readings of the coded data by the imaging apparatus from at least two code marking regions.

The code marking regions in the preferred embodiment are generally annular and are concentric. However it is also possible to provide other shapes such as hexagonal, octangonal, etc. Preferably there are provided at least two of the code marking regions, the code marking regions being generally concentric.

Where there are at least two code marking regions, preferably they are radially spaced so that code markings are provided at differing radial distances from the general centre of curvature of the code marking regions. A radially inner code marking region may provide coded data different from a radially outer code marking region.

The location marking means may comprise a highly reflective or emissive portion of the target so that radiation incident upon the location marking means is strongly reflected or radiation is strongly emitted to enable identification of the location marking means. For example, the location marking means may comprise a retro-reflective material so that a radiation source located at the imaging apparatus can direct radiation generally towards the target, the radiation being strongly reflected back towards the radiation source and hence to the imaging apparatus.

The code markings preferably comprise two visibly contrasting regions so as to represent respectively a binary "0" and "1". The code markings are preferably provided on a substrate, the substrate being selected from either an optically reflective or optically transmissive material, the code markings being operative to substantially prevent light reflection or light transmission respectively.

BRIEF DESCRIPTION OF THE DRAWINGS

Possible and preferred features of the present invention will now be described with particular reference to the accompanying drawings. However it is to be understood that the features illustrated in and described with reference to the drawings are not to be construed as limiting on the scope of the invention. In the drawings.

DESCRIPTION OF THE PREFERRED EMBODIMENT

Figure 2:
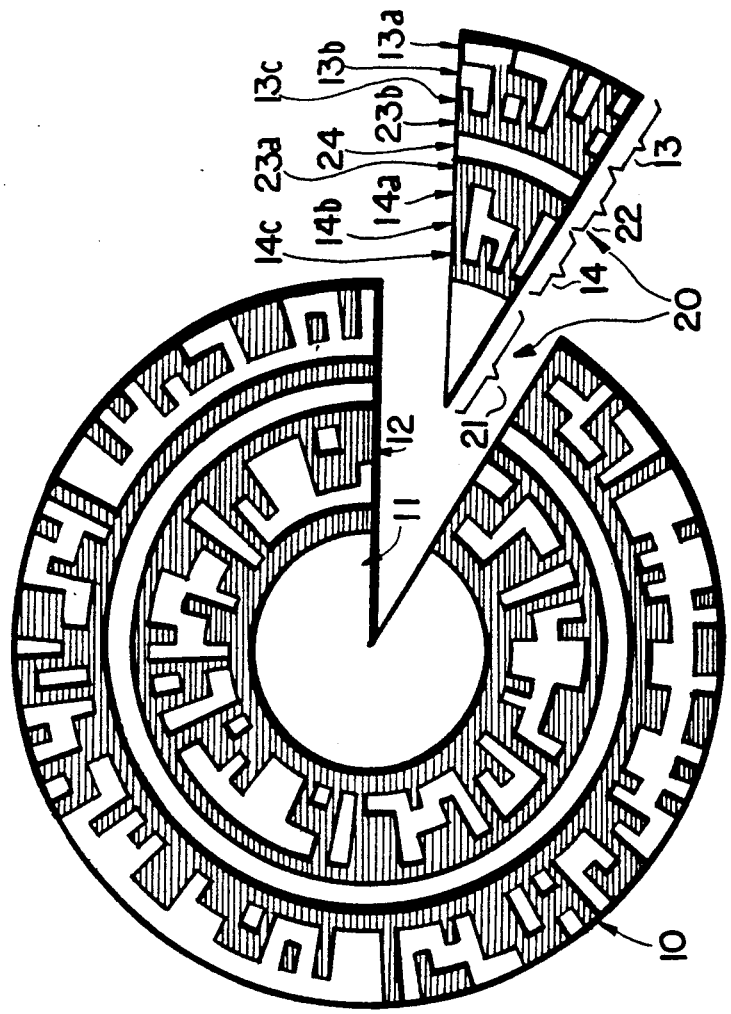
FIG. 2 shows a coded target similar to FIG. 1 in which a sector is separated for explanation.
Figure 1:
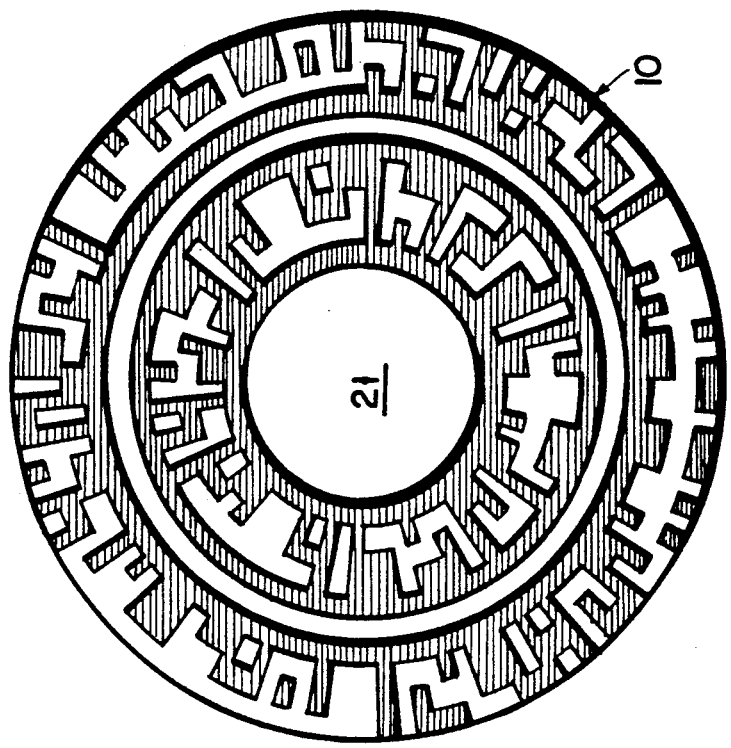
FIG. 1 shows a coded target according to the present invention.

The coded target 10 of this invention is intended to provide, together with an appropriate reader including imaging apparatus 30, a rugged visual code reading system for use in areas where bar coding exhibits severe performance limitations. The system is designed to cope with random positioning and orientation of the target 10 in a field of view 31 very much larger than the target itself, a high level of obscurity of the coded area due to viewing obstruction by surface degradation, dirt, hair or the like, and the ability to read from a randomly moving target. It will be appreciated that many of these conditions occur in the reading of animal tags. It should be understood that where reference is made throughout the specification to a "target" it is conceivable that it may be represented by a separate device attachable to an object, such as in the form of an ear tag, or it may be affixed to, or even printed directly upon an object.

The requirements of remote readability, random positioning and random obscuration dictate a level of intelligence in the reading equipment which is impossible to achieve with a scanning barcode reader. Essentially the area of interest on the object must be rapidly located and then the coded area read in a way that all spatial information in the coded area is available for deciding on the actual code present. The most rapid method of acquiring such information is through parallel reading of every information segment and this is best achieved by imaging the area into a 2-D image recording device 32 such as a film or TV camera. The information so captured can be converted to an equivalent picture in the memory of a microcomputer 33 and then processed or decoded by the microprocessor to determine the most probable code pattern present. The technology employed to decode the tag belongs to the general class of pattern and object recognition techniques. Such capability however implies either very rigidly specified patterns in terms of size and orientation or very sophisticated analytical techniques which require a large amount of computer power to process. The technology employed in the invention is such that the required coded patterns can be deciphered with relatively little program overheads. This saves on microprocessor speed and memory requirements and produces a cost effective solution for the semi-consumer market.

Further reduction in complexity with a simultaneous enhancement in performance is obtained if very high contrast is used between the coding levels. Essentially the readibility is maximum if it can be determined unambiguously whether or not a particular coding level is present at any given spatial position. The limiting case of such contrast enhancement is to have only two coding levels—one at the sensor's background level and the other at the sensor's saturation level. The present target 10 makes use of a retroreflective substrate 11 to produce an extremely high return signal. This is used as the saturation level signal. The second coding level is formed by removing or blocking out areas 12 of the substrate 11 so that they provide minimum reflected signal. This combination achieves the desired background to saturation condition. The high level of the retroreflective signal allows the detection threshold to be set high enough such that no other detail is distinguishable in the viewing area. This means that the coded regions can be easily located and that uncontrollable extraneous background effects can be neglected.

In order to cope with partial random obscuration of parts of the coded regions (13, 14) the code itself has inherent error correction capability. Also the information required to correct any particular part of the code is not situated too near that code or partial occulation may also cover the code recovery information. Since it is assumed that there is a high probability of any individual information bits being obliterated, error correcting codes based on additional check bits in the data stream are less appropriate than the preferred embodiment in which code marking regions (13a, 13b, 13c, 14a, 14b, 14c) replicate the total data stream several times over. These considerations, along with maximising information density for a randomly oriented tag are met by a code based on a circular geometry in which the coded information is replicated several times at rotationally offset positions.

The need to accurately locate the code marking regions 13a-14c on the target 10 is achieved by a system which enables a rapid initial location and then a final location based on markings which are themselves invariant to orientation. The chosen location marking means 20 are preferably based on the use of concentric high contrast circles similar in effect to a bull's-eye target. These circles allow simple and efficient algorithms to be used in computing the location, size and orientation of the tag.

There is conceptually no restriction on the size of the coded area to be read. One constraint is the word length required, which for a given physical size of coded area dictates the spatial area required per bit of information. The higher the spatial density then the more prone will be the code to obscuration effects. In practice, the bit pattern must be large enough to have an acceptably high chance of not being more than 50% occulded. Factors contributing to occlusion will depend mainly on the environment. For applications in the open air, dust would be the dominant source of contamination and bit density patterns should be significantly larger than the average dust particle size. For applications within a protecting body then grain structure of the surrounding material will be the most likely size constraint.

The other factor affecting smallness of size is the reading distance. If the target size is constant then larger reading distances require larger image magnifications. The magnification that can be obtained is dependent on aberration of the total optics system 25 and any blurring of the image due to object or camera movement. Given that movement may be controllable by using rapid exposures or by tracking, the eventual limitation in size is set by the diffraction limits of the optics 25 and the distortions inherent in the medium through which it is viewed. There is essentially no upper limit on the size of the coded area apart for the need to maintain the total area in the image field of view 34. Practical applications would imply moving the reader further away from the coded area although close up reading of areas intended for very remote reading could still be achieved through the use of special lenses or scanning techniques.

Examples of potential applications requiring coded areas of extreme size are:
Small size
  Implanted coded discs in living bodies
Large size
  Cargo container identification
  Rolling stock and vehicle identification
  Machine readable road signs.

It has been found that the optimum shape of an area which maximises the coverage of the field of view 31 but still remains completely within this field, no matter what rotational aspect it presents, is a disc. This holds for any shaped field of view, not just the rectangular one normally associated with cameras. The maximum diameter of the coded disc must be such that it can be completely accommodated in that field of view. For example in a rectangular field it is equal to the width of that rectangle.

Within this disc the code is free to take on any spatial format so long as it attempts to fill the available area. Preferably the coded area is circular, so that codes based on rotation about the centre of the circle enables maximisation of the code density while the implementation of a code which is rotationally invariant can minimise the decoding computations. Preferably the code itself is contained in nested concentric patterns 13a-14c.

The above arrangement departs from the industry adopted barcode standard in which the coding occurs in one dimension and is scanned linearly for reading. If the bars are made long enough such a barcode can be read over a reasonably wide range of angles with a single scan orientation and if the reader scans at several angles covering 90 degrees then all orientations can be catered for. However this requires "oversquare" barcode patterns in which the bar lengths are longer than the width of the coded area. This reduces the potential coding density of the area.

In object recognition systems in which an object outline is sufficient to achieve unambiguous identification, a two level pattern digitisation is sufficient. Such a binary pattern minimises both memory and computing requirements. The image pattern is established by coding the area occupied by the object as "1"s while the background is coded as "0"s. This provides a silhouette of the object in the computer's memory and is generally achieved by using a very light background and a dark object. Backlighting is preferred in most situations where it can be implemented. However, the majority of conceived uses precludes backlighting, so that preferably a retroreflective material is used as the target substrate 11. With an illumination source 26 mounted coplanar with the viewing camera optics 25 the retroreflective material 11 will glow in the same manner as if the backlighting is employed. The coding then consists of covering the retroreflective material with an opaque substance 12 or otherwise rending its retroreflectivity non-functional. The exception to this may occur in implanted codes discs where the front illuminating source can conceivably be replaced by a backlighting source. If, for example, the coded disc is implanted in the ear of an animal an intense infrared or low intensity X-ray source could be placed behind the ear with the sensor placed on the front of the ear.

The specific use of high contrast as a requirement of the coded surface differs from the standard barcode requirement in which the contrast variation between bars and substrate background is specified as 20%.

An on-axis illumination source 26 is preferably provided to achieve the high contrast. Barcode readers are always designed with off-axis illumination so that direct specular reflection from the coded surface does not interfere with the barcode reflections. Should they present a problem it is possible to eliminate them and use on-axis illumination by using polarised light. This is because retroreflective surfaces can be made to reflect circularly polarised light when exposed to a plane polarised source whereas specular reflections maintain the original plane of polarisation. The imaging device can then be arranged to sense only reflected light which has a component perpendicular to that of the source as such a component will only be present if the reflection is from a retroreflective material.

The use of retroreflective material 11 to achieve high contrast allows the imaging device to be driven into saturation. It also allows the device's sensitivity threshold to be set high enough for all other objects to become just part of a dark background. Part of this threshold setting can be achieved by reducing the camera lens aperture with a resulting improvement in the depth of field over which the code can be kept in focus. In fact, because a graded image intensity is not required, the preferred operating mode is to use an aperture small enough for the image to be diffraction limited rather than intensity limited.

To locate a coded area 13, 14 on the target 10 requires that the area itself, or an imbedded or adjacent area, emit a characteristic signal which is not reproducible by any other part of the object. For example, a uniquely coloured spot would provide locational ability for a system that could search for that colour. To add further uniqueness a spot which fluoresced under ultraviolet or X-ray stimulation could be employed. In keeping with the requirement to achieve the highest possible signal level the use of retroreflective material was selected as the optimum means of providing both the location making means 20 and the code contrast. Unlike coloured or fluorescent patches the light emanating from the retrorefective material is not uniformly scattered and is always directed back along the path of the illuminating source 26. The other techniques cause the light to be emitted with generally uniform intensity in all directions and so the achievable gain in returned light intensity for retroreflection can be orders of magnitude greater than for non-specular reflecting systems over large distances. Directed reflectivity from specular reflection can also achieve this but can only happen when the object surface is in a particular alignment with respect to source and imager. Any attempt at relaxing the source to imager alignment requirements for a specular reflector would result in drastic reflectivity drops compared to retroreflection.

Figure 5:
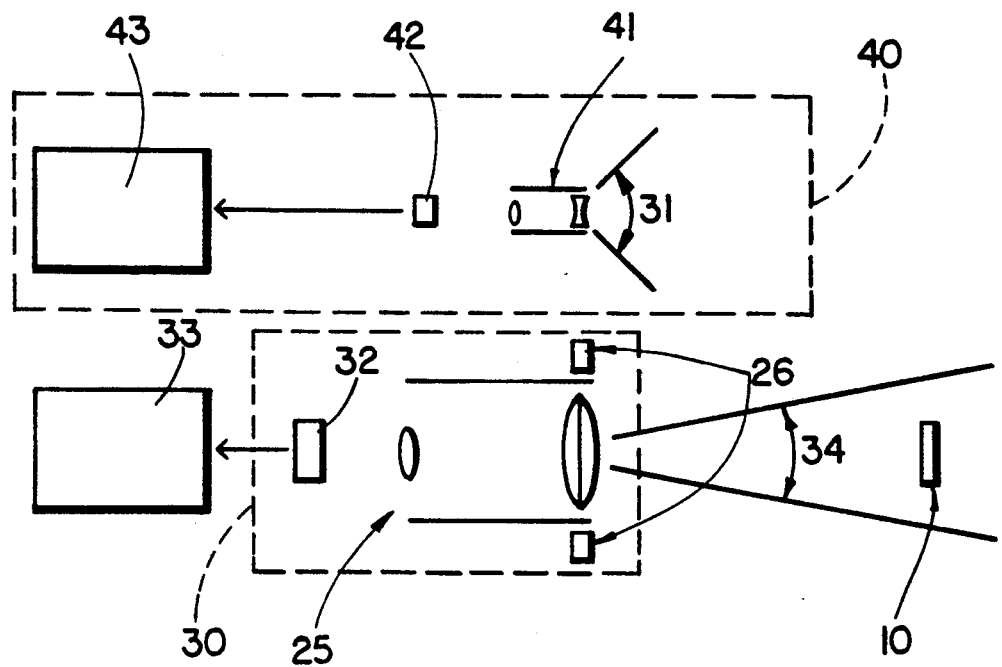
FIG. 5 is a block schematic diagram of an imaging and reading apparatus for use with a target according to the invention.
Figure 6:
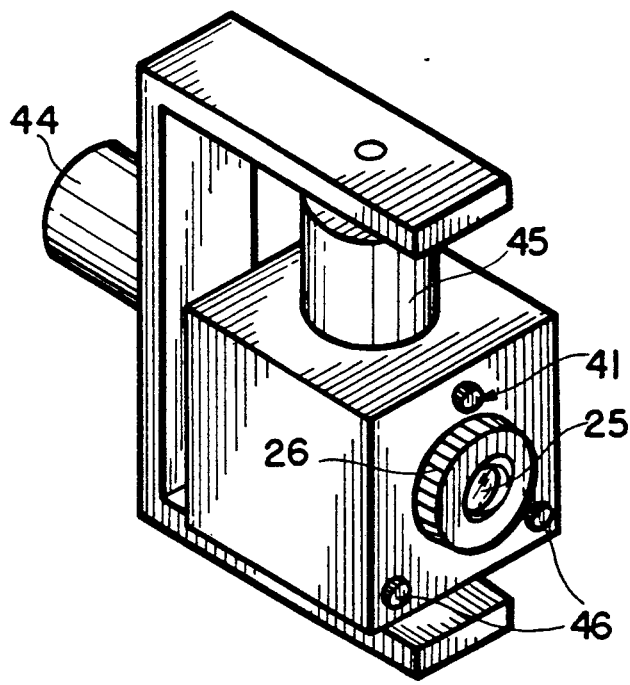
FIG. 6 is a perspective view of an optical image capture apparatus.

The reader will generally look for the bright retroreflective target 10 in a much larger field of view 31 than it can image for decoding purposes. For example, as shown in FIGS. 5 and 6, the reader may include a position sensing and tracking means 40 which includes a wide angle imaging system 41 for imaging a relatively wide angle field of view 31 onto the position sensitive detector 42. The output of the position sensitive detector 42 controls a servo tracking mechanism 43 which controls the tracking servo motors 44, 45.

Once the position sensing and tracking means 40 has located and generally centred the target within the wide field of view 31, this can bring the target within the narrow field of view 34 of the imaging apparatus 30. If desired, auto-focusing sensors 46 may be provided as is known in the image capture field.

According to the preferred embodiment the whole of the tag's substrate 11 is retroreflective, as this maximises the amount of available light. However the central "bull's eye" area 21 of the coded region is intentionally left free of code to provide a substantial "centre of gravity" for the location algorithms. This means that the tag has maximum probability for producing a centre of brightness close to the actual tag's centre. Its central location also provides the most protection from obscuration effects which are more likely to occur at the edge of the tag (e.g. hair, fur or cloth protruding over coded areas or physical edge damage). Although it is not necessary for the central area 21 to be free of obscuration an increase in the location time, and therefore decrease in reader throughput, may occur if such obscurations are present. A further consideration when using a circular code format is that the number of bits of information which can be placed in the central region 21 is small compared to the amount that can be placed in rings outside the centre. The employment of the central region 21 as a location marking means 20, therefore, represents efficient usage of the coded area while providing a simple bounded area for computer location.

The total reflective area of the tag is an important consideration in the location process. In accordance with a preferred embodiment shown in the drawings the total high visibility area of the tag is made up of the central locating area 21 plus exposed background material 11 in the coded area 13, 14 and in ring 22. The code density is such that about 50% of the coded areas 13, 14 is exposed retroreflective substrate. This area plus the central area 21, means that retroreflection occurs over 70% of the tag area. Therefore the use of the retroreflective substrate 11 behind the code not only enhances readability but also maximises the amount of total reflected signal available for location.

The purpose of the large central spot 21 is to provide an approximate tag location sufficient to allow the reader to search for finer details. The reasons for placing it in this central position are stated above—however to decode the fine detail requires accurate knowledge of the tag's position, spatial orientation and size. Best accuracy in determining these is obtained by having fiducial markers at the extremities of the coded areas 13, 14. If it is unlikely that any part of these extremities may be occulted it is preferable to extend such a fiducial mark completely around the circumference. However the extremity of the tag is the most subject to obscuration so placing this fiducial marker away for the extreme circumference is also desirable. In the present tag this fiducial mark, consists of a ring 22 having a pair of dark marking rings 23a and 23b enclosing a retroreflective annular ring 24 has been placed just inside the outer coded area 13.

This set of marking rings 23a and 23b can be computer identified by scanning out radially in any direction from the approximate centre of the tag. A series of six radial scans at different angles will provide location measurements sufficient to uniquely specify the tag's centre, size, and viewing aspect. Additional scans will provide redundant information to confirm the accuracy of the points selected. This allows for the implementation of averaging techniques which will improve the accuracy of the location and orientation parameters.

It is a premise of the system that the coded areas 13, 14 may be partially obliterated and this will lead to "burst errors" which can occult a significant portion of any code sequence. A coding format which scatters the individual bits throughout the coded region and which has a high level of redundancy is therefore desirable. In the limit, the highest level of recoverability is given by replicating the total data set an infinite number of times. In practice, several replications can provide a high probability of successful decoding—especially if the coding format contains some capability for error correction within each replication.

Given that every grey level at every pixel location contains the equivalent of one bit of information the Shannon-Hartley Theorem can be generalised to calculate the redundancy level for various spatial and intensity code densities (Ad Hoc Generalisation of Shannon-Hartley Theorem a la Taub. Schilling per C. Drane 1987). Such calculations show that a 16 digit data sequence is still significantly under utilising the effective channel width even for a noise spread equivalent to half the maximum intensity range. The effective redundancy in the code is therefore very high. With regard to the position determined areas, the relevant information could be carried in six fiducial points which once found would give position, orientation and size. The number of points actually available in the position determining annulus is 2×pi×50×6=1884 assuming each of the dark, white, dark rings covers 2 pixels and a minimum radius of 50 pixels. This represents a redundancy level of at least 300.

The simplest form of a circularly coded pattern is the set of concentric rings 13a, 13b, 13c, 14a, 14b, 14c, 23a, 23b, 24 extending from the central bulls-eye 21 to the extremity of the coded region. This produces the same code on every radius and removes the requirement to know anything about the tag's size and orientation. However if a minimum of 4 pixels is set to achieve a readable ring under all viewing aspects then the number of rings available in a tag with a 75 pixel outer radius and with a 5 pixel radius bullseye is 17. This is not enough rings for general coding requirements. Additional density can be achieved by dividing the tag into four quadrants or even finer sectors and placing a different concentric code in each sector. However the maximum coding density which produces individual coded areas of maximum width is to employ radial codes in one or more concentric annuli.

The configuration adopted for the preferred embodiment of the invention and which has been alluded to earlier is one in which the highly redundant but low information density concentric rings 23a, 23b, 24 are used solely to provide the positioning, orientation and size information. The data itself is then contained in concentric annuli 13a, 13b, 13c, 14a, 14b, 14c of radially lined patterns. The positioning bullseye 21 and location rings 23, 24 serve additionally to define the boundaries of these data bearing areas 13, 14.

Figure 4:
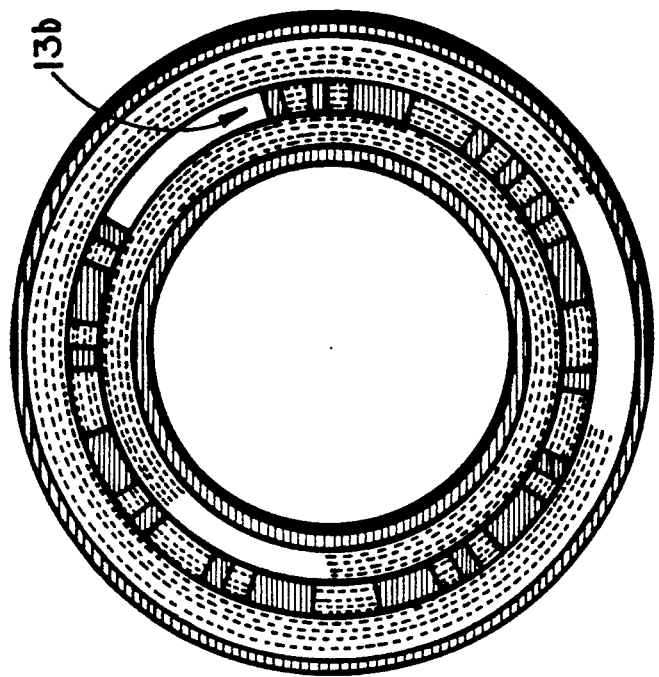
FIG. 4 shows a part of a target similar to FIG. 3 in which code markings are depicted in the inner code marking region.
Figure 3:
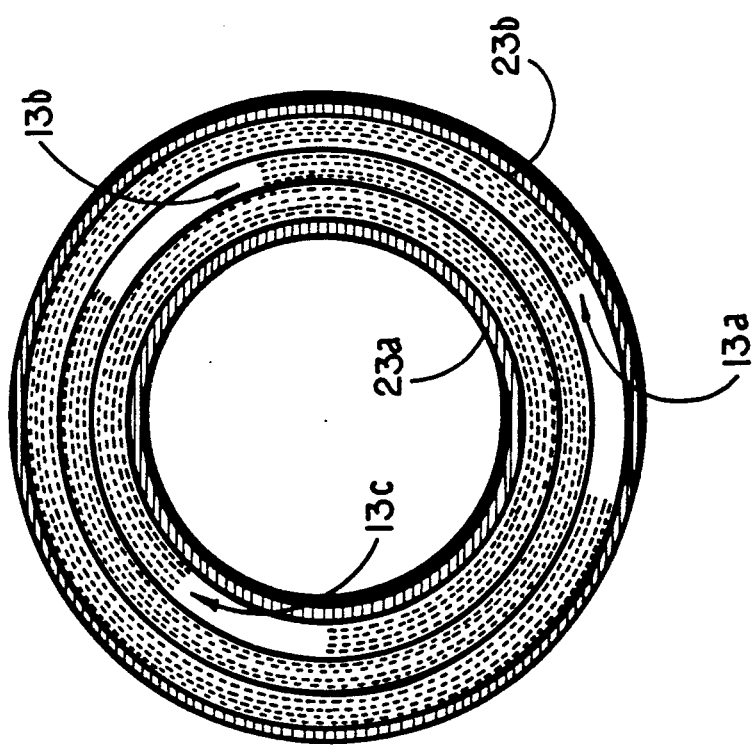
FIG. 3 shows a part of a target having three rotationally dispersed code marking regions.

The numerical code is replicated two or three times in these areas 13, 14. The most elegant means of achieving this replication is as shown in FIGS. 3 and 4 where area 13 is shown divided internally into three annuli 13a, 13b, 13c which are rotationally offset by a rotational angle of 120 degrees with respect to the adjacent code. FIG. 4 for clarity shows the code in annulus 13b only. This spreads the replications uniformly over the surface minimising the chance of two dimensional "burst errors" such as blobs and streaks covering all the idential codes. It also makes the distribution of the reflecting areas symmetric with respect to the centre 21 of the tag which allows for easier initial centre locating procedures.

The digital or alpha numeric information which is encoded into the radial patterns in the tag desirably satisfies the following criteria:
 a) use minimum spatial bandwidth,
 b) be sufficiently error resistant such that individual bit errors will be readily detected and that the chance of reading an incorrect, but valid, code is negligible.
 c) have each bit of code sufficiently replicated or otherwise scattered throughout the coding region such that the presence of spatial noise or the obscuration of significant areas of the code has low probability of making the tag unreadable.

The applicability of the industry standard barcode formats was first examined. Of the numerous codes utilised the code 128 provided the highest spatial density for a given unit bar width but was rejected in favour of the 2-of-5 code is made from a basic template of 18 equispaced white and black lines with two of the black areas shifted to fill in two of the white areas. This is a simple template to check with a low resolution imaging device compared to the code 128 which has four separate widths of code lines to check and would require an inherently higher integrity in the reading system.

In the 2-of-5 interleaved code each group of two wide bars and three narrow bars plus the equivalent set of intervening spaces represent a pair of digits. One of the digits is encoded in the lines while the other is encoded in the spaces. The number of possible combinations of two wide bars interspersed with three narrow ones is ten which allows a one-to-one correspondence to each digit. The coding is equivalent to an 18-bit code with three bits representing the width of a wide bar or space and the narrow bars and spaces represented by single bits.

In communications terminology the representation of the 18 bits utilised in this code is of the non-return-to-zero type referred to as NRZ. This binary coding format maintains each bit in its current state throughout the complete clock cycle as opposed to formats which return to the ground of zero state at some time during each cycle. Such zero returning techniques, which are utilised in some industrial barcodes, provide for self-clocking of the data bits but this is achieved at the expense of doubling the required spatial bandwidth. The NRZ format thus represents optimal use of available bandwidth so long as the clocking information can be derived separately. In the case of the tag of the invention the clocking information comes from the size and orientation of the tag as determined from the concentric coding. This provides sufficient information to compute the clock rate while start and stop bits containing the character sequence provide the initial phasing information. The use of the NRZ format is therefore the most applicable for the present tag.

The requirement of a 3 to 1 ratio in bar widths is not optimum usage of bandwidth as the information could be generated with a 2 to 1 radio within the same required spatial frequency bandwidth. The 2 of 5 code specification in fact allows for ratios between 2.2 and 3.0. However the usage of the maximum ratio of 3 to 1 in noisy, low resolution (i.e. low bandwidth) systems is preferred as the recognition of a 3-bit wide bar of space is much more tolerant of noise than is one having a smaller ratio.

Apart from using minimum bandwidth the code must also be capable of detecting errors and preferably of having sufficient redundant information to correct for at least single bit errors. In examining this aspect the hamming distance must be considered. This "distance" is the number of individual bits which have to be changed to convert from one valid code to another valid code. The straight binary coding of digits for example always has a hamming distance of 1 as a change in any bit position will produce another valid number. The same code with a parity check bit will have a hamming distance of two and this will allow for error detection but not correction. In examining the 2-of-5 interleaved code for each number pair it is possible to generate twelve other number pairs which are only two hamming units from the original pair. Of the eighteen possible bit positions there are typically seven positions in which bit reversal will not allow unambiguous error correction. So 7/18 of the time a single bit error will produce a code which although it will be recognised as an error will have an ambiguity of one or two other possible codes. The potential for ambiguity is drastically reduced if each digit is duplicated in some form in the number pair. For example if the number pair is composed of a digit and its 10's complement then a symmetry exists in the coding which produces a hamming distance of about 10 and which requires one half of the code only to be present to regenerate the digit. Such a coding halves the number of digits that can be represented but vastly improves readability in a noise prone environment. It has good potential for use in areas in which a limited number of objects require permanent identification for a long period of time—such as in the management of animals on-farm. The potential for ambiguity is also drastically reduced if comparisons across replications is utilised.

The next consideration is the potential to extend the 2-of-5 coding to include alphabetical characters. If the 2-of-5 code is expanded to a 2-of-9 code then 36 characters can be accommodated but with a higher potential for decoding errors to occur since the number of codes with lower hamming distances will be increased. A more rugged code could be achieved by using 3-of-7 interleaved code but this is restricted to 35 unique characters and may cause problems in commercial acceptability in some cases. Both the 2-of-9 and 3-of-7 interleaved codes would occupy 26 bits. By increasing the allotment to 28 bits a 3-of-8 interleaved code may be utilised which will cater for 56 unique codes and will have similar ruggedness as the 2-of-5 interleaved code.

It is possible, using presently available commercial television imaging resolutions to fit 6 digits of 2-of-5 interleaved code in the inner annulus 4 of the present tag and 10 digits in the outer annulus 3. That is 16 digits of numeric code is achievable. Other combinations such as 12 digits in the outer annulus and 4 in the inner annulus are also possible. If the 3-of-8 interleaved code is utilised then 6 alphanumeric characters could be represented in the outer annulus 3 using a slightly lower coding density. One preferred format would be to specify a tag containing 6 alphanumeric characters in the outer annulus 3 and 6 purely numeric character in the inner annulus 4, using a combination of the 3-of-8 and the denser 2-of-5 codes. Such a combination, or other similar combinations which may trade off error rate for code density, are practical and the actual combination adopted would depend on the specific application's requirements.

The final consideration is the need to disperse replications of the code over the complete area of the tag. This is required for situations in which the integrity of the tag's information cannot be guaranteed as would occur in tags applied to animals in the field. That is, whole sectors of the coded area may be obliterated or broken off. The only way to cope with this is to scatter all the information over the tag's surface. One method is to simply repeat the data string once or twice around the annulus. This is simple to read but the need to provide quiet zones of at least 10 bits between each string takes up potential coding area. For example with the same coding density discussed above the 2-of-5 interleaved digits would produce two replications of 4 digits in the outer annulus and two replications of two digits in the inner annulus resulting in only six digits of code. An alternative and preferred technique is to subdivide each coding area into three concentric sub-annuli. Each subdivision contains only one representation of the code which now occupies the whole of that sub-annulus. The same code is replicated in each of the other two sub-annulus. The same code is replicated in each of the other two sub-annuli but is rotationally offset from the previous replication by 120 degrees. This means that each code is triply replicated and the location of the replicates is such that small random obscurations have a low chance of obliterating all three locations simultaneously.

There is often a requirement that the coded disc be human readable or readable by a standard barcode device. It is a simple matter at the time of printing the coded disc to also print human readable characters—probably in a third outer annulus. This same annulus could also contain one or two representations of the code in standard barcode format—imprinted at a much higher density than the coded area of the present tag so that total code fits into the annulus along with the human readable code.

A further consideration may be the need to hide the present code under a layer of opaque material for security reasons. The use of a visible opaque but infrared transparent material such as some specific black plastics would allow this to be achieved. In addition information, such as a logo or brandname may be overprinted on this surface using infrared transparent inks if required.

Whereas a preferred embodiment has been described in the foregoing passages it should be understood that other forms, modifications and refinements are feasible within the scope of this invention.

We claim:

1. A target for providing coded data readable by an imaging apparatus, the target comprising:

location marking means for enabling location of said target by said imaging apparatus preparatory to an imaging operation carried out by said imaging apparatus;

said target further including at least two code marking regions, said location marking means being provided in a predetermined relationship to said at least two code marking regions;

each of said at least two code marking regions having a shape comprised by at least a segment of generally annular shape, and each of said at least two code marking regions including circumferentially disposed code markings containing coded data which are imaged by the imaging apparatus to enable recovery of the coded data from said target during or following said imaging operation, said at least two code marking regions sharing in common a center of curvature of said generally annular shapes and being spaced from said center of curvature at different radial distances; and each of said at least two code marking regions containing the same coded data which is located at different rotational positions relative to said center of curvature so that the coded data is replicated in full at different radial distances from said center of curvature and at least two different rotationally dispersed locations thereby enabling attempted readings of the coded data by the imaging apparatus from at least two sets of replicated code markings.

2. A target as claimed in claim 1 wherein there are three of said code marking regions each of which contains the same coded data, said three code marking regions being arranged at three different radial distances from said center of curvature, the coded data in each of said three code marking regions being angularly displaced by 120° relative to the other two of the code marking regions about said center of curvature so that the same coded data is replicated three times at equal angular intervals around said center of curvature.

3. A target for providing coded data readable by an imaging apparatus, the target comprising:

location marking means for enabling location of said target by said imaging apparatus preparatory to an imaging operation carried out by said imaging apparatus;

said target further including at least one code marking region, said at least one code marking region having a shape comprised by at least a segment of a generally annular shape, and said at least one code marking region including circumferentially disposed code markings containing coded data which are imaged by said imaging apparatus to enable recovery of the coded data from the target during or following the imaging operation;

said coded data being replicated in full at each of at least two different rotationally dispersed locations relative to the center of curvature of said generally annular shape thereby enabling attempted readings of the coded data by said imaging apparatus from at least two sets of replicated code markings, said location marking means having high visibility characteristics to enable identification of the location marking means by said imaging apparatus against a background; and said location marking means including at least one annular region which is substantially concentric with said at least one code marking region to enable fine location by said imaging apparatus of the center of curvature of said at least one code marking region.

4. A target as claimed in claim 3 wherein said annular region comprises at least two rings, one ring of said two rings having high visibility characteristics and a further ring of said two rings having contrasting low visibility characteristics, the contrasting rings facilitating identification of the annular region during the location operation.

5. A target for providing coded data readable by an imaging apparatus, the target comprising:

location marking means for enabling location of said target by the imaging apparatus preparatory to an imaging operation carried out by said imaging apparatus;

said target further including at least one code marking region, said at least one code marking region having a shape comprised by at least a segment of a generally annular shape, and said at least one code marking region including circumferentially disposed code markings containing coded data which are imaged by said imaging apparatus to enable recovery of the coded data from said target during or following the imaging operation;

said coded data being replicated in full at each of at least two different rotationally dispersed locations relative to the center of curvature of said generally annular shape thereby enabling attempted readings of the coded data by said imaging apparatus from at least two sets of replicated code markings, said location marking means having high visibility characteristics to enable identification of said location marking means by said imaging apparatus against a background, said location marking means including at least one annular region which is substantially concentric with said at least one code marking region to enable fine location by said imaging apparatus of the center of said at least one code marking region; and said annular region being located at a significant radial distance from the general center of curvature of said at least one code marking region so as to facilitate identification by said imaging apparatus of the annular region, said annular region not being located at an outer peripheral edge of the target where degradation of the annular region may interfere with the imaging operation.

6. A target as claimed in claim 5 wherein said annular region comprises at least two rings, one ring of said two rings having high visibility characteristics and a further ring of said two rings having contrasting low visibility characteristics, the contrasting rings facilitating identification of said annular region during the location operation.

7. A target for providing coded data readable by an imaging apparatus, the target comprising:

location marking means for enabling location of said target by said imaging apparatus preparatory to an imaging operation carried out by the imaging apparatus;

said target further including at least one code marking region, said at least one code marking region having a shape comprised by at least a segment of a generally annular shape, and said at least one code marking region including circumferentially disposed code markings containing coded data which are imaged by the imaging apparatus to enable recovery of said coded data from said target during or following said imaging operation, said coded data being replicated in full at each of at least two different rotationally dispersed locations relative to the center of curvature of said generally annular shape thereby enabling attempted readings of the coded data by said imaging apparatus from at least two sets of replicated code markings;

said location marking means including a central marking region located generally centrally of said at least one code marking region so that identification by said imaging apparatus of the central region of said location marking means locates the general position of the center of curvature of said at least one code marking region; and said location marking means further including at least one annular marking region radially spaced from and substantially concentric with said central marking region of the location marking means, and the identification of the annular marking region enabling fine location by the imaging apparatus of the center of curvature of said at least one code marking region.

8. A target as claimed in claim 7 wherein said annular region comprises at least two rings, one ring of said two rings having high visibility characteristics and a further ring of said two rings having contrasting low visibility characteristics, the contrasting rings facilitating identification of said annular region during the location operation.

9. A target as claimed in claim 7 wherein said annular region is located at a significant radial distance from the general center of said at least one code marking region so as to facilitate identification of said annular region, but not being located at the edge of said target where degradation of said annular region may interfere with the imaging operation.

10. An optically readable coded data retrieval system comprising a target for providing coded data and an imaging apparatus for identifying the target and recovering the coded data from the target, the imaging apparatus including:
- a radiation source operative to direct radiation generally towards said target;
- said target comprising location marking means for enabling location of said target by said imaging apparatus preparatory to an imaging operation carried out by said imaging apparatus;
- said target further including at least one code marking region, said at least one code marking region having a shape comprised by at least a segment of a generally annular shape, said at least one code marking region including circumferentially disposed code markings containing coded data which are imaged by said imaging apparatus to enable recovery of the coded data from the target during or following the imaging operation, and the coded data being replicated in full at each of at least two different rotationally dispersed locations relative to the center of curvature of said generally annular shape thereby enabling attempted readings of the coded data by said imaging apparatus from at least two sets of replicated code markings; and
- said location marking means comprising a retro-reflective material so that radiation from the radiation source of the imaging apparatus which is directed towards the target is strongly reflected back to said imaging apparatus, said imaging apparatus being operative to identify said location marking means and recover the coded data from said at least one code marking region.

11. A target as claimed in claim 10 wherein said location marking means is located generally centrally of said at least one code marking region so that identification of the location marking means also enables the general location of the center of said at least one code marking region.

12. A target as claimed in claim 10 wherein said location marking means includes at least one annular region which is substantially concentric with said at least one code marking region to enable fine location by the imaging apparatus of the general center of said at least one code marking region.

13. A system as claimed in claim 10 wherein said code markings are comprised by visibly contrasting regions so as to represent respectively a binary "0" and "1", said retro-reflective material forming a substrate of said target and the code markings being operative to substantially prevent radiation reflection from the retro-reflective material of said substrate or to permit radiation reflection from said radiation source back to the imaging apparatus.

14. An optically readable coded data retrieval system comprising:
- a target for providing coded data and an imaging apparatus for identifying said target and recovering the coded data from said target;
- said imaging apparatus including a radiation source operative to direct radiation generally towards the target;
- said target comprising location marking means for enabling location of the target by said imaging apparatus preparatory to an imaging operation carried out by said imaging apparatus, said target further including at least two code marking regions;
- each of said at least two code marking regions having a shape comprised by at least a segment of a generally annular shape, each of said at least two code marking regions including circumferentially disposed code markings containing coded data which are imaged by the imaging apparatus to enable recovery of the coded data from the target during or following said imaging operation, said at least two code marking regions sharing in common a center of curvature of said generally annular shapes and being spaced from said center of curvature at different radial distances, and each of said at least two code marking regions containing the same coded data and being located at different rotational positions relative to the center of curvature so that the coded data is replicated in full at different radial distances from the center of curvature and at least two different rotationally dispersed locations thereby enabling attempted readings of the coded data by said imaging apparatus from at least two sets of replicated code markings;
- said location marking means comprising a retro-reflective material so that radiation from said radiation source of said imaging apparatus which is directed towards said target is strongly reflected back to said imaging apparatus; and
- said imaging apparatus being operative to identify the location marking means and recover the coded data from said at least one code marking region.

15. A system as claimed in claim 10 wherein said imaging apparatus includes a position sensing and tracking means which includes a wide angle imaging system and is operative to locate and generally center said target within the wide field of view of the wide angle imaging system, said imaging apparatus further including an image recording device having a narrow field of view in which said target is located when centered within said wide field of view and which is operative to capture a focused image of the target for use in recovering the coded data from said target.

16. A target as claimed in claim 8 wherein said annular region is located at a significant radial distance from the general center of said at least one code marking region so as to facilitate identification of the annular region, but not being located at the edge of the target where degradation of the annular region may interfere with the imaging operation.

17. A target as claimed in claim 11 wherein said location marking means includes at least one annular region which is substantially concentric with said at least one code marking region to enable fine location by the imaging apparatus of the general center of said at least one code marking region.

18. A system as claimed in claim 17 wherein said code markings are comprised by visibly contrasting regions so as to represent respectively a binary "0" and "1", said retro-reflective material forming a substrate of said target and the code markings being operative to substantially prevent radiation reflection from the retro-reflective material of the substrate or to permit radiation reflection from the radiation source back to the imaging apparatus.

19. A system as claimed in claim 11 wherein said code markings are comprised by visibly contrasting regions so as to represent respectively a binary "0" and "1", said retro-reflective material forming a substrate of said target and the code markings being operative to substantially prevent radiation reflection from the retro-reflective material of said substrate or to permit radiation reflection from said radiation source back to the imaging apparatus.

* * * * *